United States Patent [19]

Penczak et al.

[11] 4,096,347
[45] Jun. 20, 1978

[54] OUTLET BOX ACCESS COVER

[75] Inventors: John P. Penczak, Euclid; Richard A. Chokenea, Sheffield Lake, both of Ohio

[73] Assignee: Bargar Metal Fabricating Company, Cleveland, Ohio

[21] Appl. No.: 714,742

[22] Filed: Aug. 16, 1976

[51] Int. Cl.² ............................................. H02G 3/12
[52] U.S. Cl. ........................................ 174/48; 52/221
[58] Field of Search ............... 174/48, 49, 67; 52/220, 52/221; 220/242, 3, 8

[56] References Cited

U.S. PATENT DOCUMENTS

| | | | |
|---|---|---|---|
| 945,753 | 1/1910 | Chamberlain et al. | 220/242 |
| 3,864,883 | 2/1975 | McMarlin | 174/48 X |
| 3,932,696 | 1/1976 | Fork et al. | 174/48 |
| 3,943,272 | 3/1976 | Carroll et al. | 174/48 |

Primary Examiner—J. V. Truhe
Assistant Examiner—David A. Tone
Attorney, Agent, or Firm—McNenny, Pearne, Gordon, Gail, Dickinson & Schiller

[57] ABSTRACT

A preset access housing assembly is disclosed for use in underfloor electrical distribution systems having a plurality of raceway cells extending below the floor surface. The housing has a base wall and a sidewall extending upwardly therefrom and terminating at an open upper end. The base wall is proportioned to bridge between at least two separate raceway cells, and is formed with a separate opening adapted to connect with the interior of each associated raceway cell. A closure closes the open end of the housing and includes a hinged cover portion and a stationary cover portion. The hinged cover portion is openable to vertically expose at least one raceway cell opening and provide easy access thereto, while the stationary cover portion blocks easy access to at least one other raceway cell opening.

19 Claims, 13 Drawing Figures

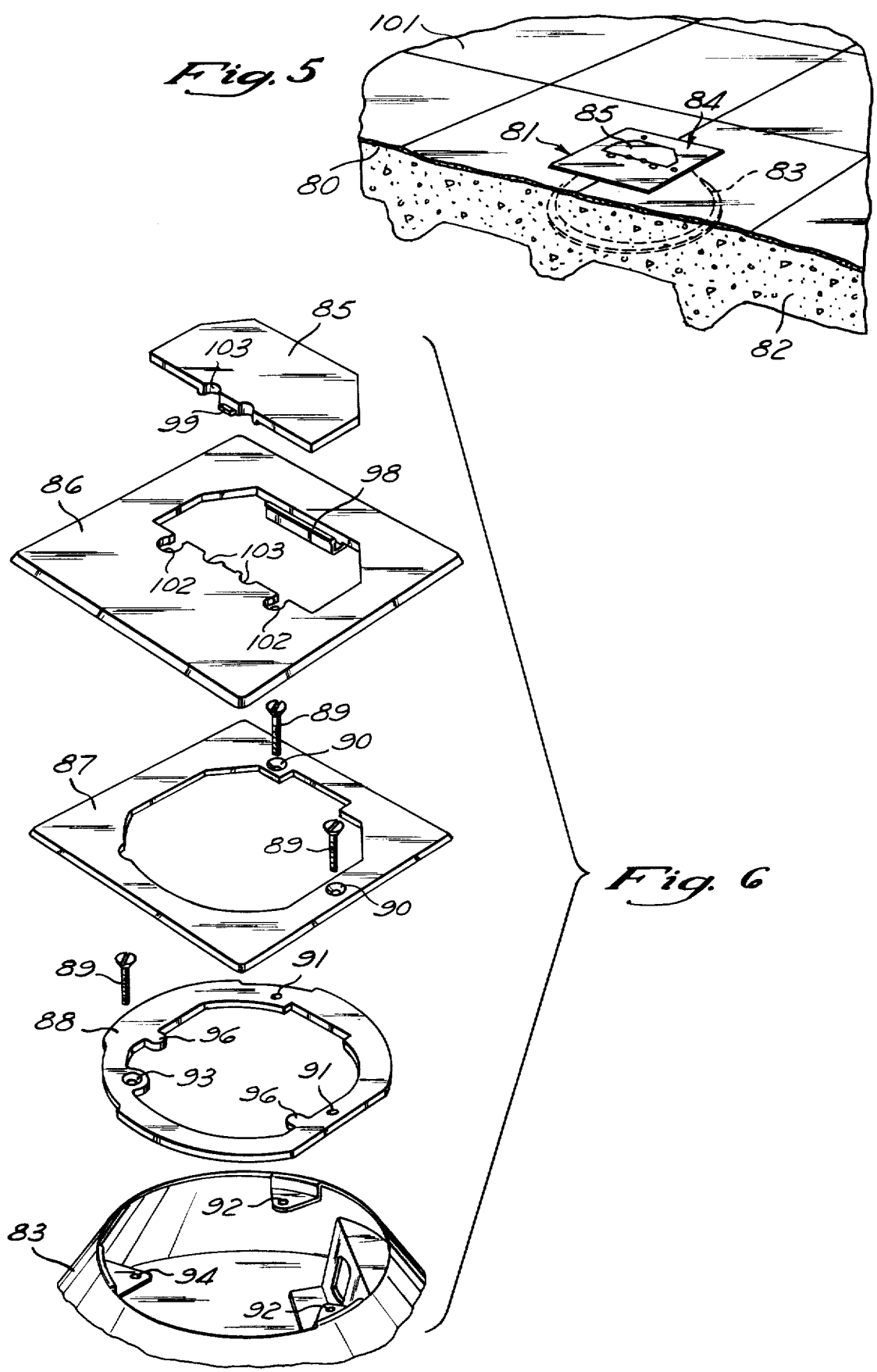

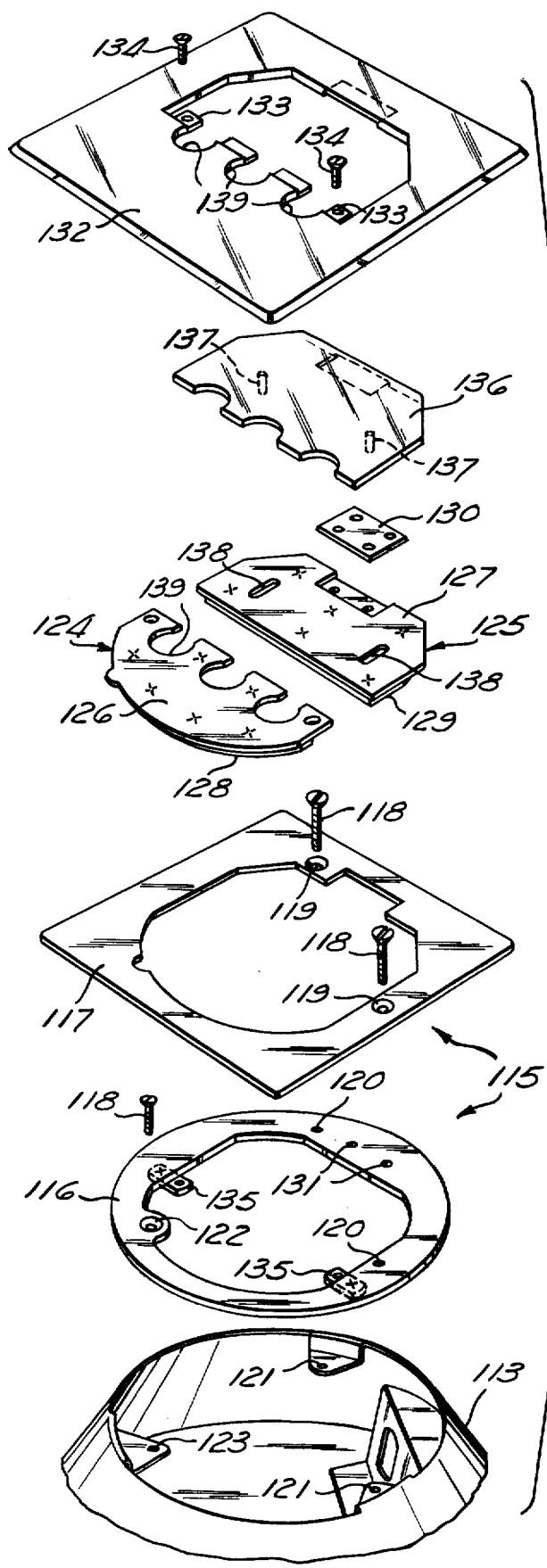
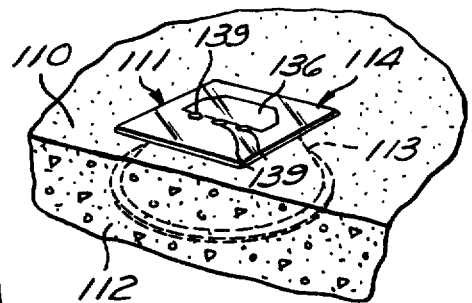
Fig. 12
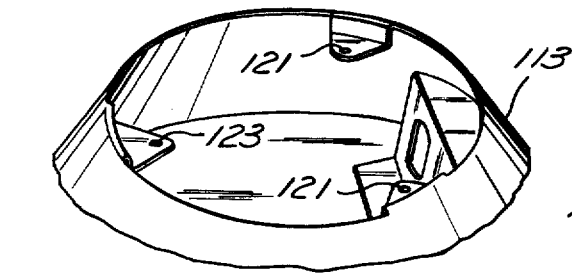
Fig. 13

OUTLET BOX ACCESS COVER

BACKGROUND OF THE INVENTION

This invention relates generally to underfloor electrical distribution systems, and more particularly to a novel and improved underfloor preset box or access housing having a cover which is hinged to allow access to frequently used electrical receptacles. Prior art housings generally include a box which is in communication with one or more underfloor raceway cells having power or telephone cables therein. Such access housings provide an opening which is flush with a finished floor and provide for an electrical plug receptacle along with space for other service connections, such as telephone connections or the like. One such housing is illustrated in Fork U.S. Pat. No. 3,701,837, granted Oct. 31, 1972, and another such arrangement is shown in U.S. Pat. No. Re. 28,035, granted June 4, 1974. The housing illustrated in both patents is rectangular in shape, and is provided with a circular floor opening located in the upper wall of the rectangular housing. Those housings are preset on the raceways so that communication is provided through access openings in the housing and in the raceways. Typically, the box would communicate with a raceway containing telephone cables and with a raceway containing electrical power. A plug receptacle is wired into the power cables and a telephone connection is made in the same box.

The concrete floor is poured up to the level of the upper edge of the box, and an access cover is provided for telephone servicing and insertion or removal of the plug of a typewriter, a lamp, or the like.

Those covers are normally bolted into the housing, and since plugs are frequently removed from the housing, it is necessary to unscrew a number of bolts each time a plug is removed or inserted. There exists a prior art arrangement which overcomes this problem by providing an access housing having a hinged access cover. However, when the cover is opened to expose the receptacles, the telephone connection is also exposed and there exists the possibility of disturbing those connections. Such a construction is set forth in Rollform Products, Inc. catalogue No. 751, pages 5 through 8.

SUMMARY OF THE INVENTION

This invention overcomes many of the prior art problems by providing an access housing for underfloor electrical distribution systems, which includes a closure having a hinged portion. The hinged portion is openable to vertically expose at least one raceway cell opening to provide easy access thereto. The vertically exposed raceway cell opening permits easy access to one or more raceway cells having a receptacle supplied with electrical power so that cords from a lamp or typewriter can be plugged into the receptacle supplied with 110-volt power. This arrangement permits rapid and convenient removal and insertion of various plugs in the receptacle without the necessity of unscrewing the cover. Another portion of the cover is screwed to the housing to prevent easy vertical access to at least one other raceway which would carry telephone service lines. By preventing easy access to the telephone service lines, one is assured that those service lines will not be disturbed by a person inserting or removing a plug from the receptacle. Of course, the fixed cover may be removed for telephone servicing, but such servicing is not as frequent as plug insertion or removal in the hinged area of the housing.

The housing is preferably of the type set forth in copending application Ser. No. 638,176, filed Dec. 5, 1975. That housing has a sidewall which is generally conical having a first diameter and converging to the opened end which has a second diameter substantially smaller than the first diameter. The conical shape of the housing permits the use of a thinner gauge sidewall, and eliminates the problem of cracking of the concrete adjacent the mouth of the housing. A support ring is fastened to the open mouth of the access housing by screws, and a support frame is fastened to the ring by spot welding. Within the frame there is provided a cover assembly which includes the fixed cover and a hinged cover. Carpeting may be laid over the housing and may be cut to permit access to the housing. In other disclosed embodiments, plastic facing members may be provided which cover the carpet or tile. In all cases, it is desirable not to have metal portions exposed on the carpet or tile.

BRIEF DESCRIPTION OF THE DRAWINGS

FIG. 5 is a perspective view, partially broken away for purposes of illustration, showing a floor system including a preset access housing in accordance with another aspect of the present invention;

FIG. 6 is an exploded, perspective view of the assembly illustrated in FIG. 5;

FIG. 12 is a perspective view, partially broken away for purposes of illustration, showing a floor system including a preset access housing in accordance with another aspect of the present invention; and FIG. 13 is an exploded, perspective view of the access housing shown in FIG. 12.

DETAILED DESCRIPTION OF THE INVENTION

Figure 1:
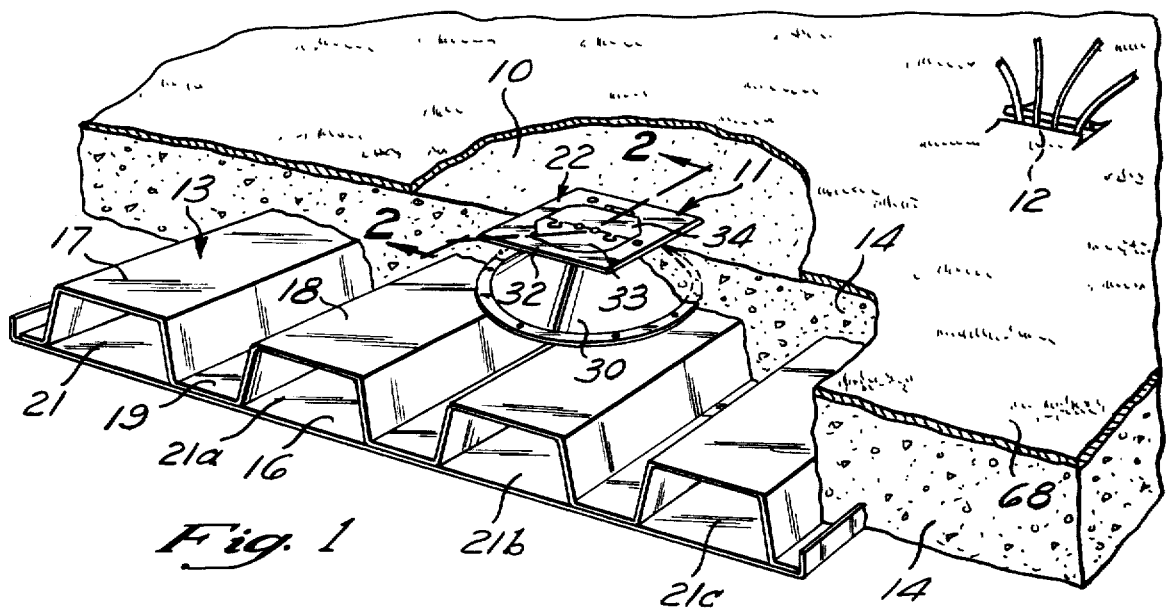
FIG. 1 is a perspective view, partially broken away for purposes of illustration, showing a floor system including preset access housings in accordance with the present invention.

Referring now to the drawings, and particularly to FIGS. 1 through 4, there is illustrated a floor 10 having two preset access housing assemblies 11 and 12, in accordance with one aspect of the present invention. The floor includes a cellular floor unit 13, which is embedded in and covered by the concrete 14 of the floor. The cellular floor unit includes a bottom plate 16 and a top plate 17, formed with alternate crests 18 and troughs 19.

The bottom and top plates 16 and 17 cooperate to define a plurality of raceway cells 21, which extend along the floor parallel to each other to receive wire and cable of an electrical distribution system.

The present access housing assembly 11 bridges between the cells 21a and 21b, and extends from the crest 18 to the surface of the floor 10. A removable access cover assembly 22 provides user access to the housing, and is provided with openings 23, 24, 25, and 26 (FIG. 3), through which cords can extend into the housing. The illustrated housing is preferably arranged to provide a typical duplex receptacle supplied with electrical power so that a cord 27 from a lamp or typewriter, for example, can be plugged into the duplex receptacle supplied with 110-volt power. Similarly, a cord 28 can be connected to the telephone lines. In such instance, the telephone service lines are supplied along the cell 21a and the 110-volt power supply lines extend along the cell 21b. In FIG. 1 the preset access housing assembly 12 is illustrated to bridge between the cells 21b and 21c. It should be understood that any given preset access housing assembly can be installed to bridge between any particular pair of adjacent cells desired, and that different types of service can be supplied along different cells 21.

Figure 2:
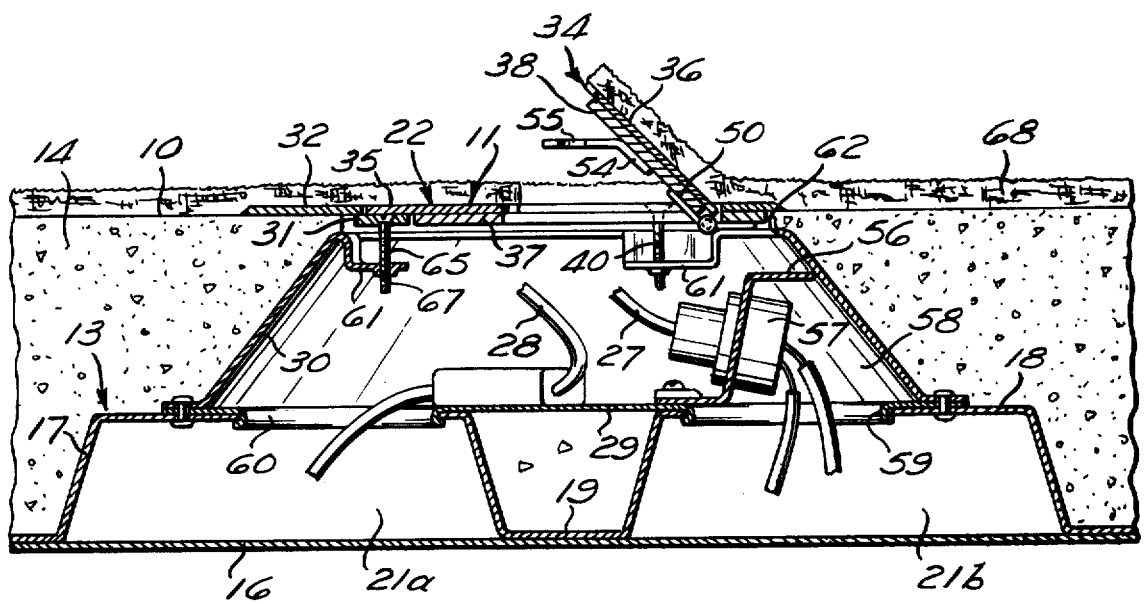
FIG. 2 is a cross sectional view, the plane of the section being indicated by the line 2—2 in FIG. 1.
Figure 3:
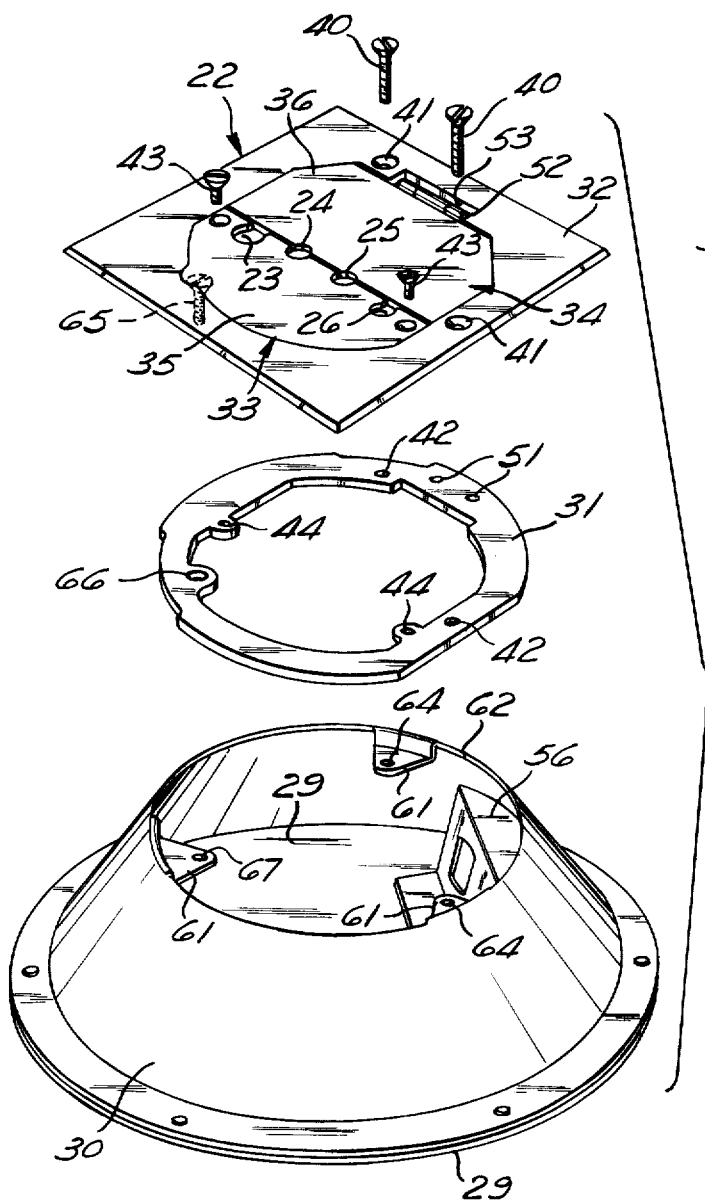
FIG. 3 is an exploded, perspective view of the access housing shown in FIGS. 1 and 2 of the drawings.
Figure 4:
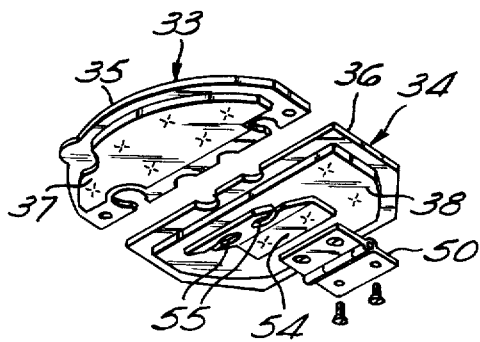
FIG. 4 is a bottom perspective view of the cover assembly according to this invention.
Figure 7:
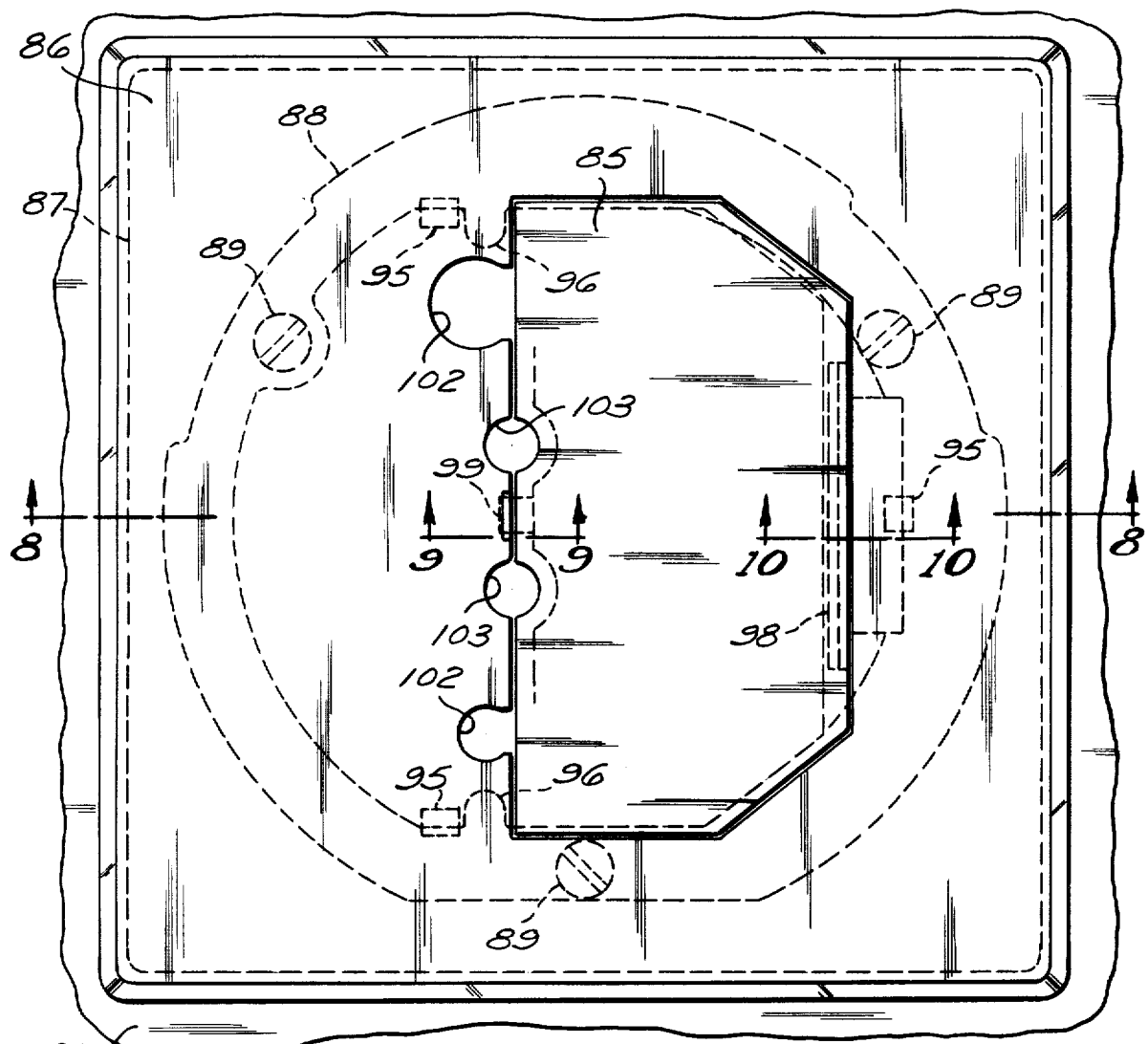
FIG. 7 is a plan view illustrating the access housing of FIGS. 5 and 6.
Figure 8:
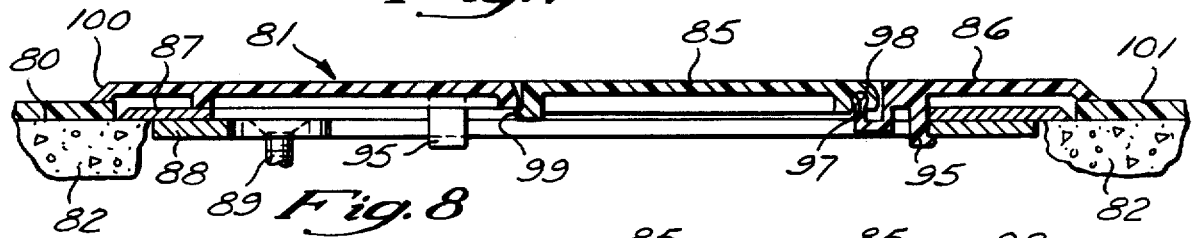
FIG. 8 is a fragmentary, sectional view, the plane of the section being indicated by the line 9—9 in FIG. 7.
Figure 9:
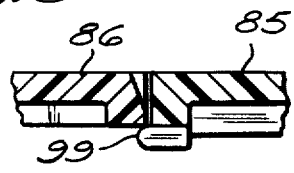
FIG. 9 is a fragmentary, sectional view, the plane of the section being indicated by the line 9—9 in FIG. 7.
Figure 10:
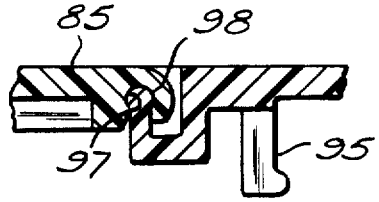
FIG. 10 is a fragmentary, perspective view, the plane of the section being indicated by the line 10—10 in FIG. 7.
Figure 11:
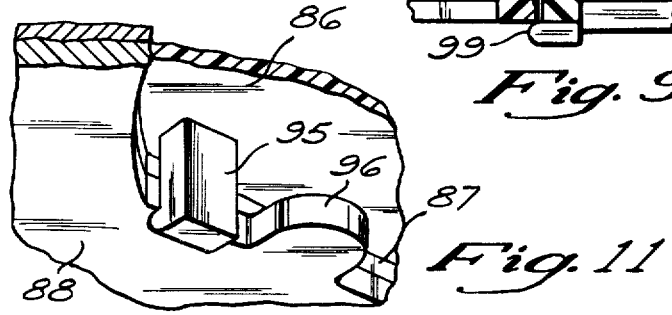
FIG. 11 is a fragmentary, perspective view, showing the manner in which the access cover assembly is connected to a support ring.

Referring to FIGS. 2 and 3, the illustrated access housing assembly includes a circular base plate 29 formed of sheet metal, a sidewall comprising a conical housing member 30, also formed of sheet metal, a metallic support ring 31, and the cover assembly 22, which includes a finish or support frame 32 and access covers 33 and 34. The cover 33 is a stationary cover, while the cover 34 is a movable cover. The access covers 33 and 34 are formed by upper finish plates 35 and 36 having stiffening members 37 and 38 spot-welded to their lower faces so that relatively thin gauge material may be employed for the plates 35 and 36. It may be noted that the peripheries of the stiffening members 37 and 38 conform to the inner periphery of the ring 31 so that the plates 35 and 36 may rest on the support ring 31. The support ring 31 is spot-welded to the frame 32 and to ensure proper initial alignment of the support ring with respect to the frame 32, drift pins or screws 40 may be inserted through countersunk holes 41 to extend through holes 42 in the ring. Alternatively, or in addition to the screws 40 or drift pins, screws 43 or drift pins may be threaded or inserted through holes in the cover plate 35 and then inserted or threaded through threaded holes 44 in the ring 31.

The cover 34 is a pivotally openable access cover which is connected to the support ring, and therefore to the frame 32, for easy access to the interior of the conical housing member 30. To this end, there is provided a hinge 50, one leaf of which is screwed to the undersurface of the stiffening member 38 and the other leaf of which is screwed into the undersurface of the support ring 31 through apertures 51. It may be noted that the undersurface of the stiffening member 38 and the undersurface of the support ring 31 are normally coplanar. The pivot pin portion 52 of the hinge is received within a slot 53 in the frame 32 so as to be beneath the plane of the upper surface of the frame 32.

The apertures 23 and 26 in the illustrated embodiment are intended to carry telephone service lines or lines which are not frequently disturbed and are formed in the cover 33, while the apertures 24 and 25 are intended to carry 110-volt power supply lines and their configuration is shared by the cover 33 and the cover 34. It should now be apparent that when the cover 34 is raised, the telephone supply lines will be held captive by the apertures in the fixed cover while the 110-volt power supply lines will be freed for removal. Thus, the telephone supply lines will not be disturbed by insertion or removal of the power supply lines. The power supply lines are also held by a keeper plate 54, which has cord receiving apertures 55 therein.

A mounting bracket 56, illustrated in FIGS. 2 and 3, is secured to the base plate 29 and is proportioned to support a duplex receptacle 57 and to completely isolate a power zone 58 within the housing from the remaining portions of the access housing. The bracket also closes and isolates an opening 59 communicating with the power supply cell 21b from the remaining portions of the access housing.

Another opening 60 permits access to the cell 21a, which carries the telephone cables.

During installation of the concrete 14, the housing is preferably closed by a temporary cover plate (not shown) which rests on tongues 61 so that it is generally coplanar with an upper rim 62 of the conical housing 30. The cover plate closes the conical housing while the concrete is poured. The concrete can be trowelled out evenly without difficulty over the cover, and after the concrete sets, the thin layer of concrete over the temporary cover is broken away and the cover is removed, allowing the installation of the cover assembly 22. This is accomplished by removing the screws 43 and 40 from the holes 44 and 42 in the mounting ring and then removing the cover plate 33. The support ring is then positioned on the conical housing, and the screws 40 are inserted through the holes 41 and into holes 64 in the projection 61. A screw 65 is inserted through a countersunk hole 66 in the support ring 31, and then through a hole 67 in a projection 61. After the telephone lines are installed, the cover 33 is screwed to the support ring by the screws 43, which cooperate with the holes 44 in the support ring 31. It may be noted that the head of the screw 65 is covered by the fixed cover 36 to prevent inadvertent removal of the entire closure assembly, since removal of the screw 65 would necessitate prior removal of the cover 33. Desirably, the duplex fixture 57 would also be installed with the fixed cover removed, and the cover 34 pivoted to an open position.

Carpeting 68 may then be laid over the access housing 11 and over the access housing 12, as is illustrated in FIG. 1, and provided with an H-pattern cut so that the movable cover 34 may be raised along with its portion of the carpet and so that the carpeting may be peeled back to expose the fixed cover 33 for removal purposes.

The hinged or movable cover 34 may be raised to vertically expose the duplex fixture and to provide easy access thereto for insertion or removal of plugs from the receptacle. The fixed cover 33 blocks the telephone connection from easy vertical access so that that connection is not disturbed by access to the duplex receptacle. If servicing is required for the telephone connections, the fixed cover may be unscrewed to provide access thereto.

Turning now to the embodiment shown in FIGS. 5 through 11, there is illustrated a floor 80 having a preset access housing assembly 81, in accordance with a further aspect of the present invention. The floor includes a cellular floor unit (not shown) similar to the floor unit illustrated in FIGS. 1 and 2, which is embedded in and covered by the concrete 82 of the floor. Since the cellular floor unit is the same as that illustrated in the previous embodiment, no further detailed description will be resorted to herein. Also, a conical housing 83 is provided, which is similar to that illustrated in FIGS. 1 and 2, and no further detailed description of that housing will be made.

An access cover assembly 84 is provided, and includes a hinged access cover 85, a top finish cover 86, a metallic top finish plate 87, and a metallic support ring 88. The hinged cover 85 and the top finish cover 86 are preferably fabricated from a polycarbonate resin.

The top finish plate 87 and the finish ring 88 are fixed to each other and to the conical housing 83 by three screws 89, two of which pass through countersunk holes 90 in the top finish plate 87, through holes 91 in the finish ring 88, and then through holes 92 in inwardly projecting tabs provided on the conical housing 83, while one screw 89 passes through a countersunk hole 93 in the finish ring and then through a hole 94 in an inwardly projecting tab provided on the conical housing 83. The top finish cover 86 is attached to the top finish plate 87 and to the finish ring 88 by lugs 95, which project downwardly from the lower surface of the top finish plate 86 and engage the inner peripheries of the finish plate and the finish ring. This arrangement may be seen most clearly in FIG. 11. To aid in locating the lugs 95, projections 96 are provided on the finish ring.

The hinged cover 85 is pivoted to the top finish cover 86. To this end, there is provided a cylindrical groove 97 in the cover which snaps over a cylindrical projection 98 in the finish cover 86. It may be noted that the cover 85 slightly overlaps the top finish plate, and that the cover 85 is held in its closed position by a lip 99 (FIG. 9) which snaps under an edge of the top finish cover 86. The edges of the top finish plate 87 rest on the floor 80 and the lugs 95 are dimensioned so that a lip 100 of the finish cover 86 rests on floor tile 101.

Telephone service line apertures 102 are formed in the finish cover 86 and 110-volt lines are received through apertures 103 formed partially in the finish cover 86 and partially in the hinged cover 85, so that the 110-volt power supply lines are easily freed when the hinged cover 85 is opened, but the telephone service lines are held captive by the finish cover 86.

It may now be appreciated that the hinged cover 85 may be opened to provide easy vertical access to a duplex receptacle, but the finish cover 86 blocks easy vertical access to the telephone supply connections. If servicing is required on those connections, the finish cover 86 may be quickly removed from the finish ring and the finish plate.

Referring now to FIGS. 12 and 13, there is illustrated a still further embodiment of the present invention. In those figures, there is illustrated a floor 110 having a preset access housing assembly 111. The floor includes a cellular floor unit (not shown) similar to the floor unit illustrated in FIGS. 1 and 2, which is embedded in and covered by the concrete 112 of the floor. Since the cellular floor unit is the same as that illustrated in FIGS. 1 and 2, no further detailed description will be resorted to herein. Also, a conical housing 113 is provided, which is similar to that illustrated in FIGS. 1 and 2, and no further detailed description of that housing will be made.

An access cover assembly 114 is provided, and includes a support weldment 115. The weldment 115 comprises a finish ring 116 spot welded to a top finish plate 117. The top finish plate 117 and the finish ring 116 are fixed to the conical housing 113 by three screws 118, two of which pass through countersunk holes 119 in the top finish plate 117 through holes 120 in the finish ring 116, and then through holes 121 in inwardly projecting tabs provided on the conical housing 113, while one screw 118 passes through a countersunk hole 122 in finish ring 116, and then through a hole 123 in an inwardly projecting tab provided on the conical housing 113.

The cover assembly 114 further includes access covers 124 and 125. The cover 124 is a stationary access cover, while the cover 125 is a pivotally openable access cover. The access covers 124 and 125 are formed by upper finish plates 126 and 127 having stiffening members 128 and 129 spot welded to their lower faces so that relatively thin gauge material may be employed for the plates 126 and 127. It may be noted that the peripheries of the stiffening members 128 and 129 conform to the inner periphery of the ring 116 so that the plates 126 and 127 may rest on the support ring 116.

The cover 125 is pivotally connected to the support ring 116, and therefore to the top finish plate 117, for easy access to the interior of the conical housing 113. To this end, there is provided a hinge 130, one leaf of which is screwed to the upper surface of the stiffening member 129 and the other leaf of which is screwed into the upper surface of the finish ring 116 through apertures 131. It may be noted that the upper surface of the stiffening member 129 and the upper surface of the finish ring 116 are normally coplanar.

In the embodiment disclosed in FIGS. 12 and 13, the carpeting is covered by the top finish plate 117. In such an arrangement, all metallic members are covered by a plastic top finish cover 132. That cover has recessed tabs 133 which receive screws 134. Those screws extend through the access cover 124 and into tabs 135 in the finish ring 116 to hold the assembly together. There is also provided a plastic access finish cover 136 for the access cover 125. The cover 136 has depending tabs 137 which are received by slots 138 in the cover 125. The slots permit movement of the plastic cover 136 toward and away from the hinged area of the cover 125 so that the plastic cover 136 will not tend to bind against the plastic cover 132 as the cover 136 is raised with the access cover 125. Apertures 139 are provided for telephone and 110-volt A.C. connections.

If carpet installation is to be made over the assembly, the plastic covers 132 and 136 may be omitted and the carpet may be cut as illustrated in FIG. 1. In this instance, it is convenient to provide a brass rivet through the carpeting and into one of the slots 138 to serve as a handle when the access cover 125 is raised.

Although preferred embodiments of this invention are illustrated, it should be understood that various modifications and rearrangements of parts may be resorted to without departing from the scope of the invention disclosed and claimed herein.

What is claimed is:

1. A preset access housing for underfloor electrical distribution systems having raceway cells extending below the surface of a concrete or the like floor, comprising a base wall proportion to bridge between at least two separate raceway cells and formed with separate openings adapted to connect with the interior of each associated raceway cell, a sidewall extending upwardly from said base wall and terminating at an upper open end, said sidewall being proportioned to locate said open end adjacent to but below the surface of a floor, and closure means secured to and closing said open end, said closure means comprising support and frame assembly means, said assembly means comprising a support ring fixed to the upper open end of said sidewall and a finish frame fixed to said support ring and defining an access opening therethrough, a stationary cover covering a portion of said access opening and being fixed to said assembly means, and a movable cover pivotally connected to said assembly means.

2. A preset access housing according to claim 1, wherein said sidewall is generally conical having a first diameter and converging to said open end which has a second diameter substantially smaller than said first diameter.

3. A preset access housing according to claim 1, wherein said movable cover and said stationary cover cooperate to define apertures for receiving service leads.

4. A preset access housing according to claim 3, wherein at least the major portion of at least one aperture is defined by said stationary cover.

5. A preset access housing for underfloor electrical distribution systems having raceway cells extending below the surface of a concrete or the like floor, comprising a base wall proportioned to bridge between at least two separate raceway cells and being formed with separate openings adapted to connect with the interior of each associated raceway cell, a sidewall extending upwardly from said base wall and terminating at an upper open end, said sidewall being proportioned to locate said open end adjacent to but below the surface of a floor, and closure means secured to and closing said open end, said closure means comprising a support ring fixed to the upper open end of said sidewall, a finish frame fixed to said support ring and defining an access opening therethrough, a stationary cover covering a portion of said access opening and being fixed to said support ring, and a movable cover pivotally connected to said finish frame.

6. A preset access housing according to claim 5, wherein said sidewall is generally conical, having a first diameter and coverging to said open end, which has a second diameter substantially smaller than said first diameter.

7. A preset access housing according to claim 5, wherein said movable cover and said stationary cover cooperate to define apertures for receiving electrical leads.

8. A preset access housing according to claim 7, wherein at least the major portion of at least one aperture is defined by said stationary cover.

9. A preset access housing according to claim 5, wherein said movable cover and said stationary cover are generally coplanar with said finish frame.

10. A preset access housing according to claim 5, wherein said stationary cover is removably attached to said support ring.

11. A preset access housing according to claim 5, wherein reinforcing means are fixed to said stationary cover and to said movable cover.

12. A preset access housing according to claim 5, wherein power lead retaining means is fixed to said movable cover.

13. A preset access housing for underfloor electrical distribution systems having raceway cells extending below the surface of a concrete or the like floor, comprising a base wall proportioned to bridge between at least two separate raceway cells and formed with separate openings adapted to connect with the interior of each associated raceway cell, a sidewall extending upwardly from said base wall and terminating at an upper open end, said sidewall being proportioned to locate said open end adjacent to but below the surface of a floor, closure means secured to and closing said open end, said closure means comprising a support ring fixed to said open end, a top finish plate having an access opening therethrough fixed to said support ring, a top finish cover fixed to said top finish plate and to said support ring, a portion of said finish cover being pivotally openable to expose only a portion of the area defined by the access opening in said top finish plate, a portion of the remainder of said finish cover comprising a stationary cover covering remaining portions of the access opening in said top finish plate.

14. A preset access housing according to claim 13, wherein said sidewall is generally conical, having a first diameter and converging to said open end, which has a second diameter substantially smaller than said first diameter.

15. A preset access housing according to claim 13, wherein said pivotally openable portion of said cover and said stationary cover cooperate to define apertures for receiving service leads.

16. A preset access housing according to claim 15, wherein at least the major portion of at least one of said apertures is defined by a portion of said stationary cover.

17. A preset access housing according to claim 13, wherein said finish cover is fixed to said finish plate and to said ring by lugs which project from said finish cover and engage said support ring.

18. A preset access housing for underfloor electrical distribution systems having raceway cells extending below the surface of a concrete floor or the like, comprising a base wall proportioned to bridge between at least two separate raceway cells and formed with separate openings adapted to connect with the interior of each associated raceway cell, a sidewall extending upwardly from said base wall and terminating at an upper open end, said sidewall being proportioned to locate said open end adjacent to but below the surface of a floor, closure means secured to and closing said open end, said closure means comprising a support ring fixed to said open end, a top finish plate having an access opening therethrough fixed to said support ring, a stationary cover closing one portion of said access opening, a pivotally openable access cover closing the remaining portion of said access opening, a top finish cover covering said top finish plate and said stationary cover and an access finish cover fixed to said pivotally openable cover and being substantially coplanar with said top finish cover.

19. A preset access housing according to claim 18, wherein said pivotally openable cover is provided with slots and wherein said access finish cover includes tabs depending into said slots.

* * * * *